(12) United States Patent
Norton

(10) Patent No.: US 7,631,797 B2
(45) Date of Patent: Dec. 15, 2009

(54) MAGNETIC PLUG WELD TOOL

(75) Inventor: Donovan K. Norton, La Verne, CA (US)

(73) Assignee: Dueston Mfg. Co., La Verne, CA (US)

( * ) Notice: Subject to any disclaimer, the term of this patent is extended or adjusted under 35 U.S.C. 154(b) by 35 days.

(21) Appl. No.: 11/956,135

(22) Filed: Dec. 13, 2007

(65) Prior Publication Data

US 2009/0084829 A1   Apr. 2, 2009

Related U.S. Application Data

(60) Provisional application No. 60/874,539, filed on Dec. 13, 2006.

(51) Int. Cl.
 *B23K 5/22* (2006.01)
(52) U.S. Cl. .................. 228/50; 228/226; 219/160
(58) Field of Classification Search .................. 228/50, 228/216; 219/160; 269/8
 See application file for complete search history.

(56) References Cited

U.S. PATENT DOCUMENTS

| | | | |
|---|---|---|---|
| 1,648,683 A * | 11/1927 | Herald | ............... 219/137 R |
| 2,584,072 A | 1/1952 | White | |
| 2,866,889 A | 12/1958 | Dempsey | |
| 3,135,047 A | 6/1964 | Houser | |
| 3,437,251 A | 4/1969 | Wilkes | |
| 3,548,489 A | 12/1970 | Arikawa et al. | |
| 3,570,109 A * | 3/1971 | Harlan et al. | ............... 228/216 |
| 4,190,998 A | 3/1980 | Keith | |
| 4,205,219 A | 5/1980 | Snell | |
| 4,295,593 A * | 10/1981 | Kensrue | ............... 228/50 |
| 5,451,741 A | 9/1995 | Doronin et al. | |
| 7,410,087 B1 * | 8/2008 | Owensby | ............... 228/44.5 |

FOREIGN PATENT DOCUMENTS

JP   72002011 B  *  1/1972

OTHER PUBLICATIONS

Third posting of "Plug welding small holes-Here's a tip?" on http://www.hotrodders.com, posted Feb. 6, 2006.*
Definition of Thumb screw: http://en.wikipedia.org/wiki/Thumbscrew_(fastener).*
Eastwood Co., 4 and 8 Inch Magnetic Copper Butt-Weld Backer Set., <http://www.eastwoodco.com/shopping/product/detailmain.jsp?jProductID=21231>; Dec. 13, 2007.
Eastwood Co., 4 and 8 Inch Magnetic Copper Butt0Weld Backer Set. "Customer Reviews"; Dec. 13, 2007.
Eastowood Co., Plugweld Pliers., <http://www.eastwoodco.com/shopping/product/detailmain.jsp?iProductID=10856>; Dec. 13, 2007.

* cited by examiner

*Primary Examiner*—Jessica L. Ward
*Assistant Examiner*—Kevin E Yoon

(57) ABSTRACT

A magnetic based welding tool having an adjustment knob, a pivot arm, and a copper alloy pad, designed to assist with welding holes, for example, in sheet metal, that are to be welded closed with a MIG or TIG welder, by providing a backup to the hole, to keep the welding material from coming through the hole in excess amounts, and a magnetic base to hold the tool onto a ferrous metal panel, such as steel, with an adjustable arm to keep the copper alloy pad away from the magnetic base and in firm contact with the surface to be welded.

19 Claims, 5 Drawing Sheets

MAGNETIC PLUG WELD TOOL

CROSS-REFERENCE TO PRIORITY APPLICATION

This application relies for priority on the filing date, Dec. 13, 2006, of U.S. Provisional Application No. 60/874,539, entitled "Magnetic Plug Weld Tool", to inventor Donovan Norton, all the contents of which are incorporated herein by this reference.

FIELD OF INVENTION

This invention relates, generally, to devices for assisting with welding holes, for example, in sheet metal, by providing a backup to the hole, to keep the welding material from coming through the hole in excess amounts. This tool will work with wire feed welders, such as Gas Metal Arc Welding, commonly called Metal Inert Gas welding (MIG); flux-cored wire welding; and with Tungsten Inert Gas (TIG) welding, which is also called Gas Tungsten Arc Welding (GTAW) and Heliarc® which was Linde's trade name for the TIG process when it was introduced many years ago.

BACKGROUND

The art of welding is used for many purposes, but often to fill holes that have been left in surfaces, for example screw holes or rivet holes left in sheet metal, such as on the side of a car or truck body.

When welding closed a hole in light gauge sheet metal with a wire feed welder, such as a MIG welder, the welding operator must start the weld at one side of the hole, and move around the perimeter of the hole, working towards the center.

This sort of welding often poses a problem, as the wire feed weld wire will often go through the hole, causing the welding operator to have to cut off the lead of the wire and start again with a fresh lead.

A further problem arises when the heat from the welding machine melts the sheet metal around the hole, making the hole larger, not smaller. Even if the hole is not made larger, the heat often distorts the sheet metal body panels, creating more problems to be fixed.

Another problem arises because the back surface of what is being welded accumulates a mound of metal from the weld built-up on the front and backside of the sheet metal panel. The excess welded material on the front side can usually be ground off, but the welded material that remains on the inside of a sheet metal body panel often is inaccessible to a grinder. This is especially true of the extra mirror holes that tend to accumulate on the sides of old truck doors.

While, a welding operator could try to have an assistant hold something on the other side of the hole being welded closed, this is not usually practical, as it doubles the labor cost, and often, such an extra person simply is not usually available.

Magnets have long been used to hold backup devices in place for welding, but most required bulky magnets with screw assemblies, e.g., U.S. Pat. No. 2,584,072 to White, and U.S. Pat. No. 2,866,889 to Dempsey. These old magnetic devices did not have a means for spacing the backup device away from the magnet to protect the magnet from the heat.

There are commercially available "plugweld pliers" that support the weld area, use copper alloy pads to absorb excess heat, and cover the back of the hole, as the weld is being applied. One such example of these plugweld pliers is sold by Eastwood Co. on its website at www.eastwoodco.com under the Auto Body; Body & Fender; Body Tools & Accessories section. Unfortunately, these types of plugweld pliers only work on areas that are within two inches of the edge of a sheet of metal, and on which the back end of the hole is readily accessible and exposed, to affix the plugweld pliers.

Also available from Eastwood Co. on its website at www.eastwoodco.com under the Auto Body; Body & Fender; Body Tools & Accessories section is a product known as a magnetic copper butt-weld backer set. These copper alloy plates have magnets to hold them to the back of a hole, which is good because the welding material does not stick to the copper alloy plate. Unfortunately, as noted in the Customer Reviews on the Eastwood Co. website, the magnets do not have enough holding power, and they lose their power due to repeated heating.

In order to address these and other issues, there remains a long felt need in the art for a magnetic plug weld tool that has sufficient magnetic power to hold onto metal, even in tight spaces, with spacing between the copper alloy plate, and that does not require that the hole to be plugged is within two inches of the edge of the sheet metal. The inventor has solved all of these problems with a tool that works and has experienced significant commercial success in the many months that it has been available for purchase by the welding public.

SUMMARY OF THE INVENTION

Various embodiments of the invention are directed towards overcoming the above shortcomings by disclosing an invention that uses a magnetic base holding a magnet to hold the copper alloy plate surface against the backside of the hole to be welded. This backer makes the hole easier to weld, and leaves a flat surface on the backside of the sheet metal.

In various embodiments of the invention, the copper alloy plate makes a smooth surface to which the hot molten weld material does not adhere.

The tool will work on all sheet metal and steel to facilitate welding closed holes and voids. The tool can be used anytime that the welder can get access to the backside of the hole or void, but the hole need not be within two inches of an edge, and the hole may be in metal, like the door of a car or truck, where the backside is relatively difficult to access, and not readily available for the welder to hold something on the backside of the hole.

Using the tool of this invention, a welder can start the weld in the center of the hole, using a circular motion to fill the hole, which is a much quicker, and often more esthetically pleasing method of filling than with any of the prior art devices or methods.

In addition, because the holes can be welded closed much quicker, the metal panels do not get subjected to as much heat; therefore they do not get distorted as much as with other tools or methods of welding the holes closed.

The tool of this invention prevents the wire on a wire feed welder from feeding through the hole to be filled, and thus saves material. More importantly, the tool of this invention saves time, because the welder does not need to stop welding as frequently, to cut off the long overfeed of wire, thus saving more time, and enabling more items to be welded in a shorter period of time.

The copper alloy plate acts as a heat sink, taking and dissipating quicker the excess heat that builds up on the backside of the hole being welded. This further helps to reduce damage and distortion to the metal sheet being welded.

The pivot arm may be of any of a variety of lengths, widths, and configurations, but serves primarily to separate the copper alloy plate from the magnet, so the heat of the welding does not damage the power of the magnet.

The copper alloy plate may be of any of a number of shapes, sizes, and configurations, and may be attached to the pivot arm in a number of ways, including by a cotter pin, a rivet, or any of a number of other means known to those of skill in the art.

The copper alloy plate may have its ends bent up, to facilitate easy attachment, as in the preferred embodiment, but it need not employ that configuration to be within the scope of the invention as disclosed and claimed here.

The contact portion of the copper alloy plate may be of any of a variety of surface types, including serrated, smooth, ridged, or any of a number of other means known to those of skill in the art.

The copper alloy plate may be made of any of a number of alloys of copper.

In order to overcome the problem associated with lining up the backup right at the backside of the hole being welded, and holding the copper alloy plate flush with the inner surface of the metal sheet, a thumb screw is used to pivot the arm holding the copper alloy plate, so it lies flush with the back surface. This will work, even if the portion of sheet metal where the hole is being welded closed is not generally flat. Thumb screws in multiple lengths, widths, shapes, sizes, and with varying kinds of knobs on top are readily available, for example, from Shear-Loc® Products, at their website, www-.shear-loc.com.

Various embodiments of the invention can have various shapes and configurations of knobs on the thumb screws.

Various embodiments of the invention further feature a non maring pad at the bottom of the thumb screw, to go directly against the inside surface of the sheet metal or steel being welded, for use with a magnet that is connected to the center section of the pivot arm.

The pivot arm itself operates much like a human arm, where the copper alloy plate is the palm of the hand, the first pin, or rivet, acts like the wrist, and the second pin, or rivet, acts like the elbow. This configuration permits the tool to be manipulated at many different angles, to accommodate surfaces with various angles, radii of curvature, or rough patches.

The base with magnet housing portion of the tool can be affixed to any ferrous surface, and the pivot arm may be adjusted to bring the copper alloy plate in contact with the back of the hole to be welded closed.

It further remains within the contemplation of the invention for this magnetic plug weld tool to be used in other varying combinations, and ways, as may be known in the art.

DETAILED DESCRIPTION OF THE DRAWINGS

In the following detailed description of various embodiments of the invention, numerous specific details are set forth in order to provide a thorough understanding of various aspects of one or more embodiments of the invention. However, one or more embodiments of the invention may be practiced without these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive. Also, the reference or non-reference to a particular embodiment of the invention shall not be interpreted to limit the scope the invention.

Figure 1:
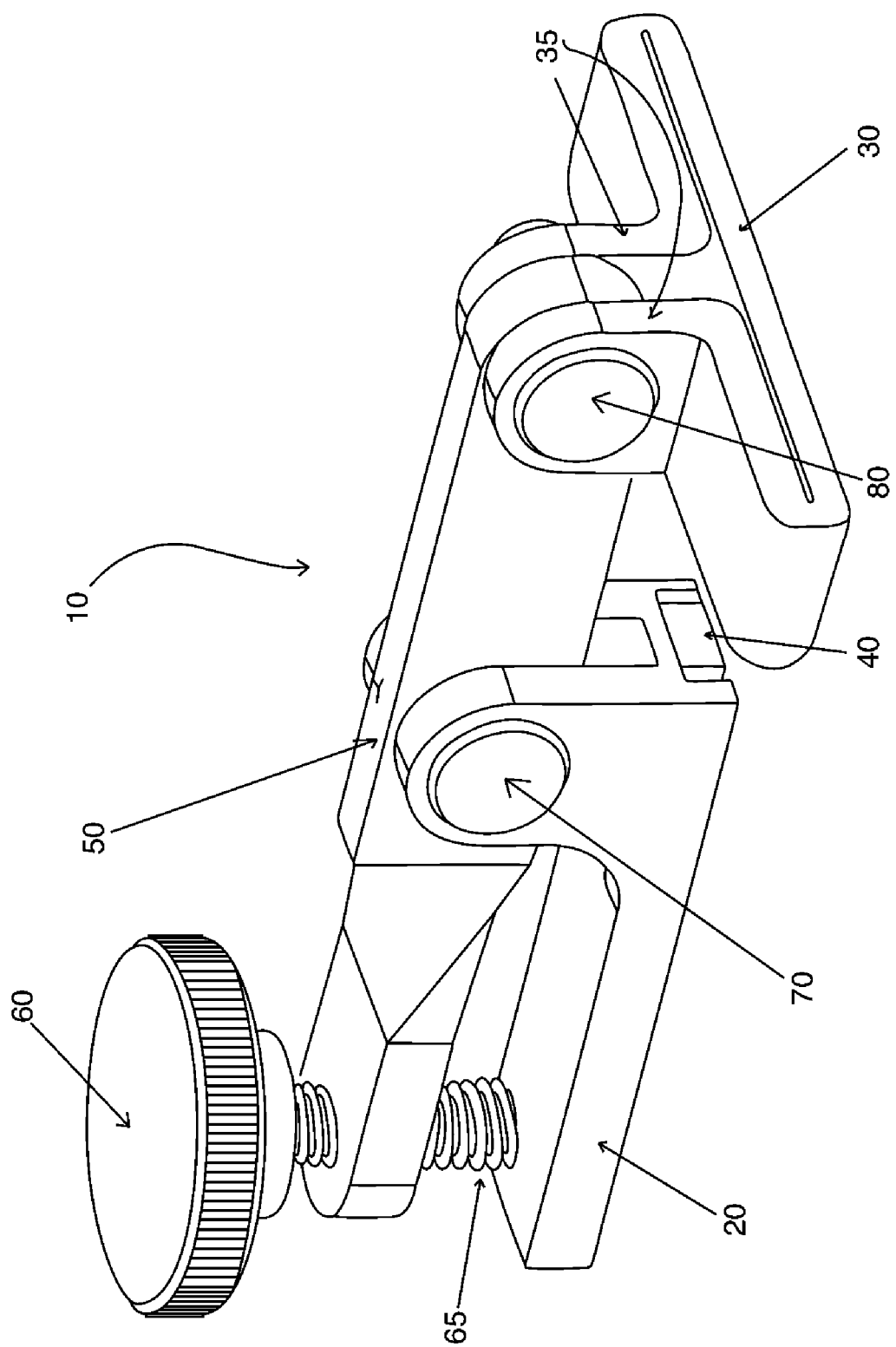
FIG. 1 is a perspective view of the magnetic plug weld tool.

FIG. 1 is an illustration in perspective view of the magnetic plug weld tool 10. The magnetic plug weld tool 10 has a base with magnet housing 20, a magnet 40, a copper alloy plate 30 in one of a variety of shapes and sizes, with its copper wings bent up 35. The copper alloy plate 30 with copper wings bent up 35 is rotatably connected to the proximal end of a pivot arm 50 by a pin 80. The base with magnet housing 20 is rotatably connected to the mid-section of the pivot arm 50 by a pin 70. The distal end of pivot arm 50 has a hole through which is inserted a thumb screw 65 topped with a knob 60.

Figure 2:
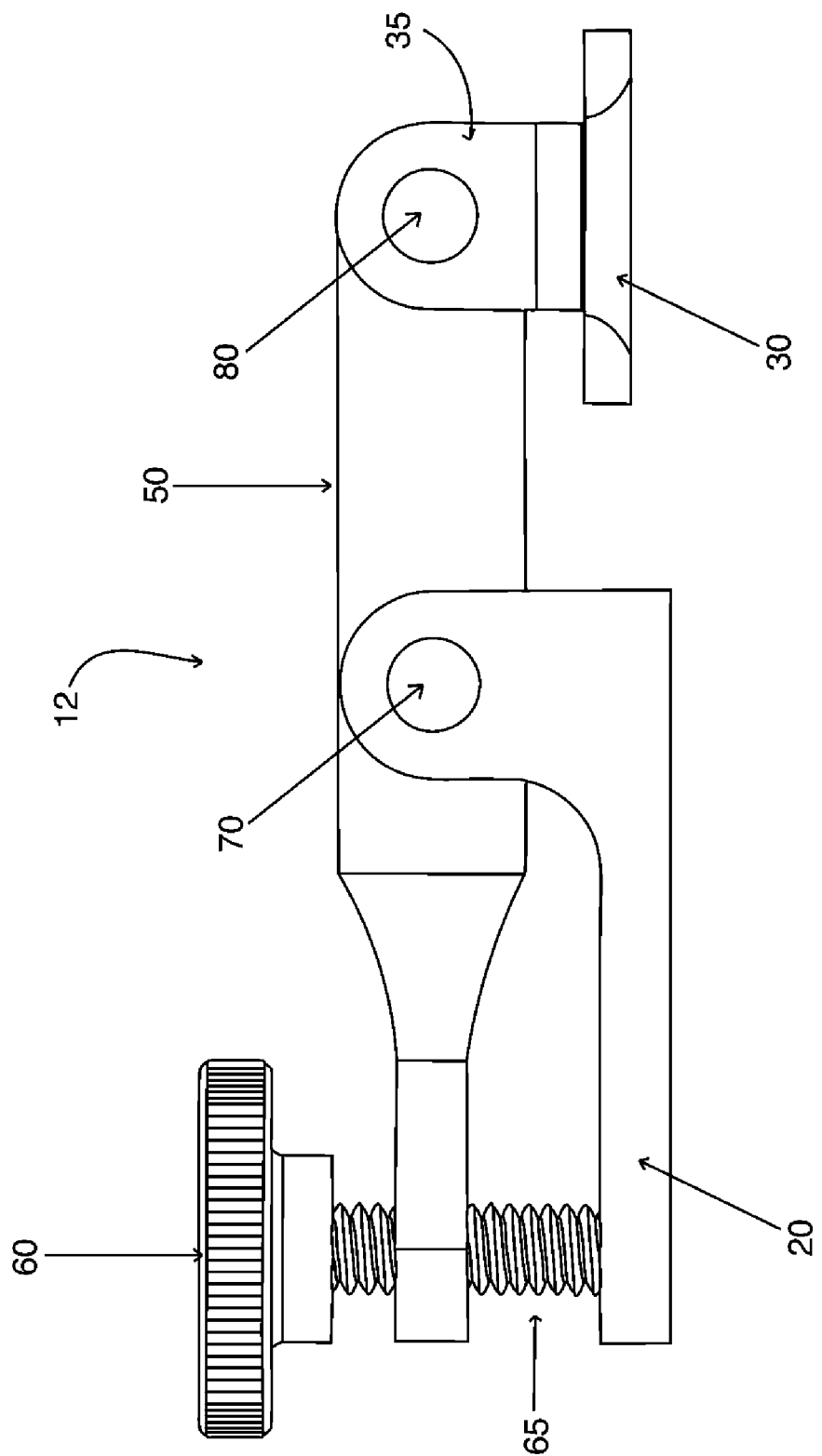
FIG. 2 is a side view of the magnetic plug weld tool.

FIG. 2 is a side view of the magnetic plug weld tool 12. The magnetic plug weld tool 12 has a base with magnet housing 20, a copper alloy plate 30 with copper wings bent up 35. The copper alloy plate 30 with copper wings bent up 35 is rotatably connected to the proximal end of a pivot arm 50 by a pin 80. The base with magnet housing 20 is rotatably connected to the mid-section of the pivot arm 50 by a pin 70. The distal end of pivot arm 50 has a hole through which is inserted a thumb screw 65 topped with a knob 60.

Figure 3:
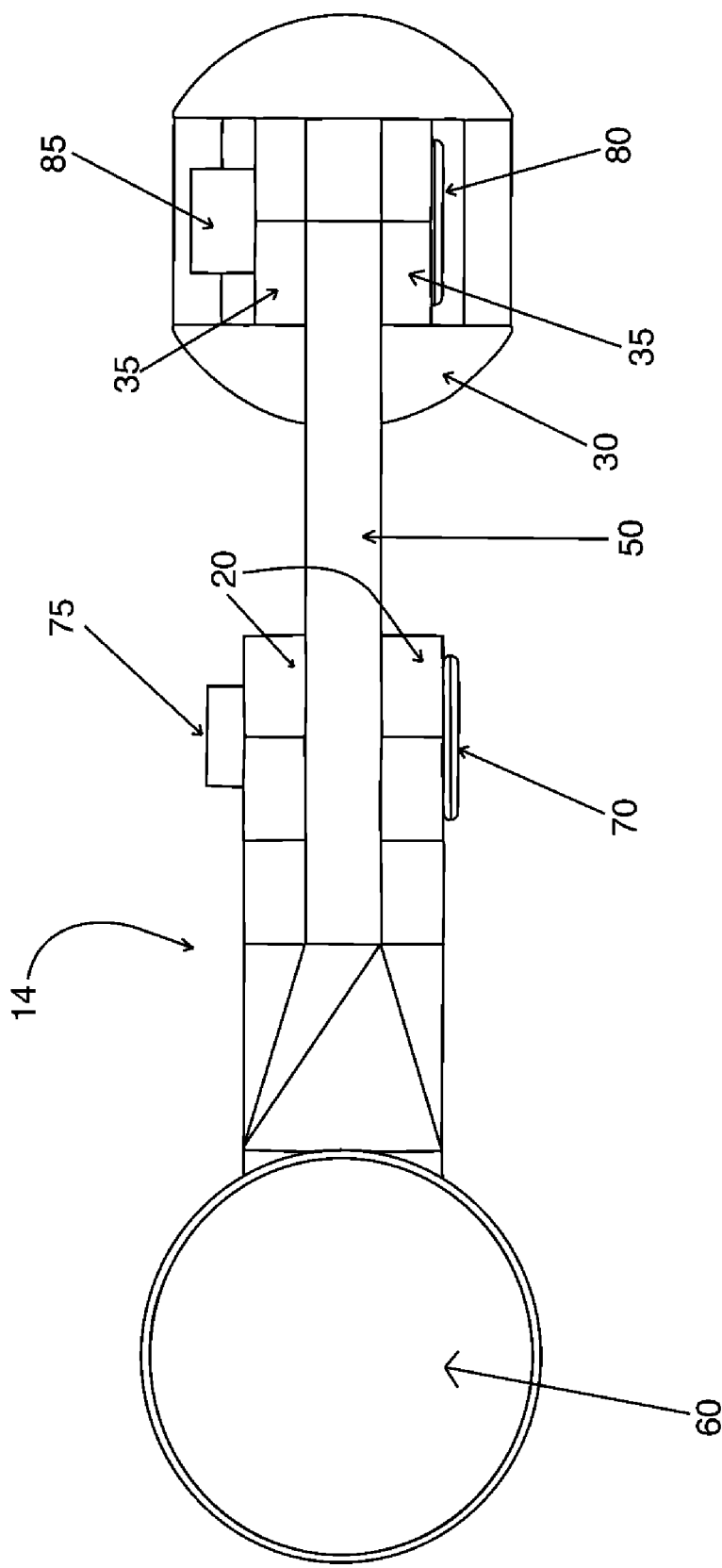
FIG. 3 is a top plan view of the magnetic plug weld tool.

FIG. 3 is a top plan view of the magnetic plug weld tool 14. The magnetic plug weld tool 14 has a base with magnet housing 20, a copper alloy plate 30 with copper wings bent up 35. The copper alloy plate 30 with copper wings bent up 35 is rotatably connected to the proximal end of a pivot arm 50 by a pin 80 that has an end 85 that may be removably attached. The base with magnet housing 20 is rotatably connected to the mid-section of the pivot arm 50 by a pin 70 that has an end 75 that may be removably attached. The distal end of pivot arm 50 has a hole through which is inserted a thumb screw that is topped with a knob 60.

Figure 4:
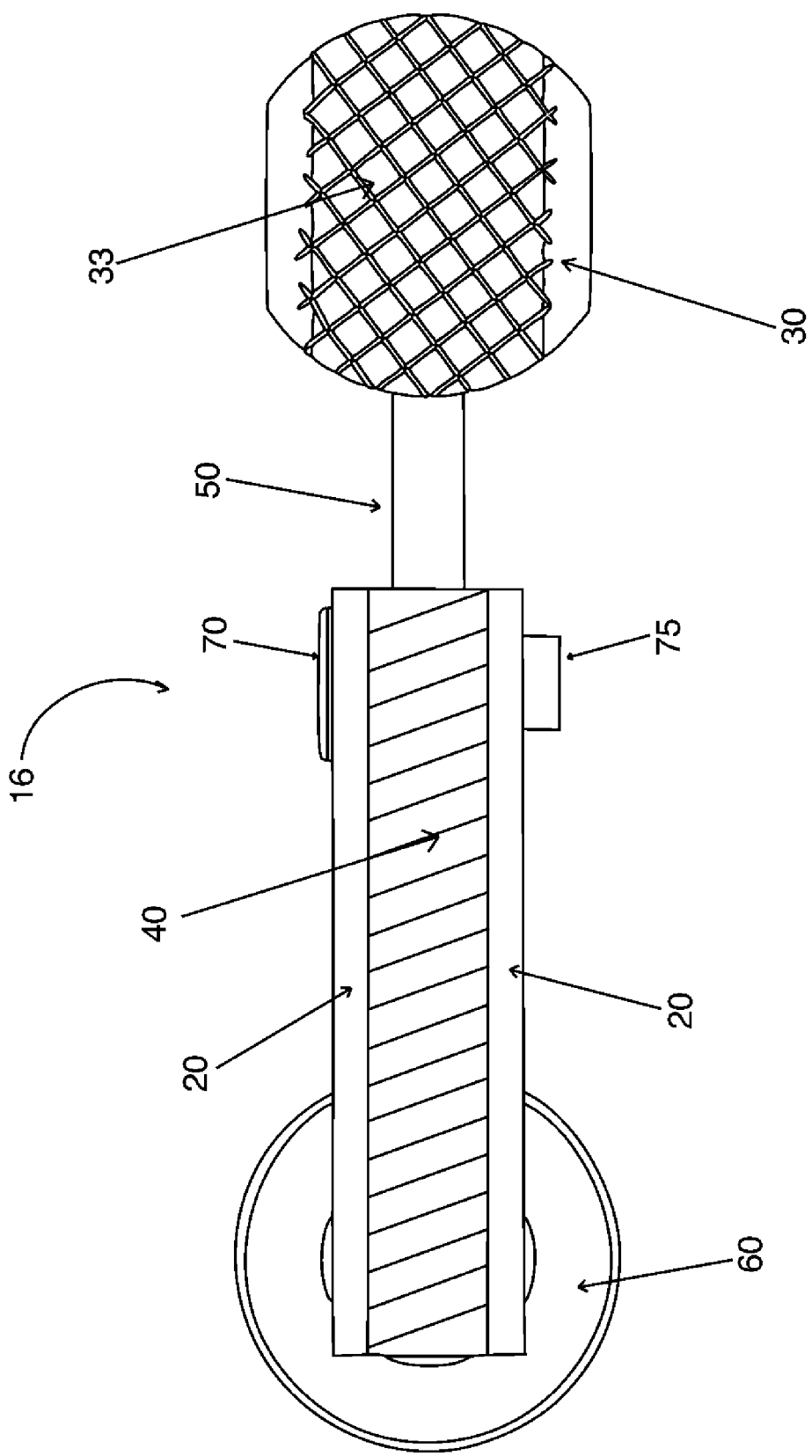
FIG. 4 is a bottom plan view of the magnetic plug weld tool.

FIG. 4 is a bottom plan view of the magnetic plug weld tool 16. The magnetic plug weld tool 16 has a base with magnet housing 20, a magnet 40, a copper alloy plate 30 with a serrated surface 33 that contacts the welding material. The copper alloy plate 30 with a serrated surface 33 that contacts the welding material is rotatably connected to the proximal end of a pivot arm 50. The base with magnet housing 20 containing magnet 40 is rotatably connected to the mid-section of the pivot arm 50 by a pin 70 that has an end 75 that may be removably attached. The distal end of pivot arm 50 has a hole through which is inserted a thumb screw that is topped with a knob 60.

Figure 5:
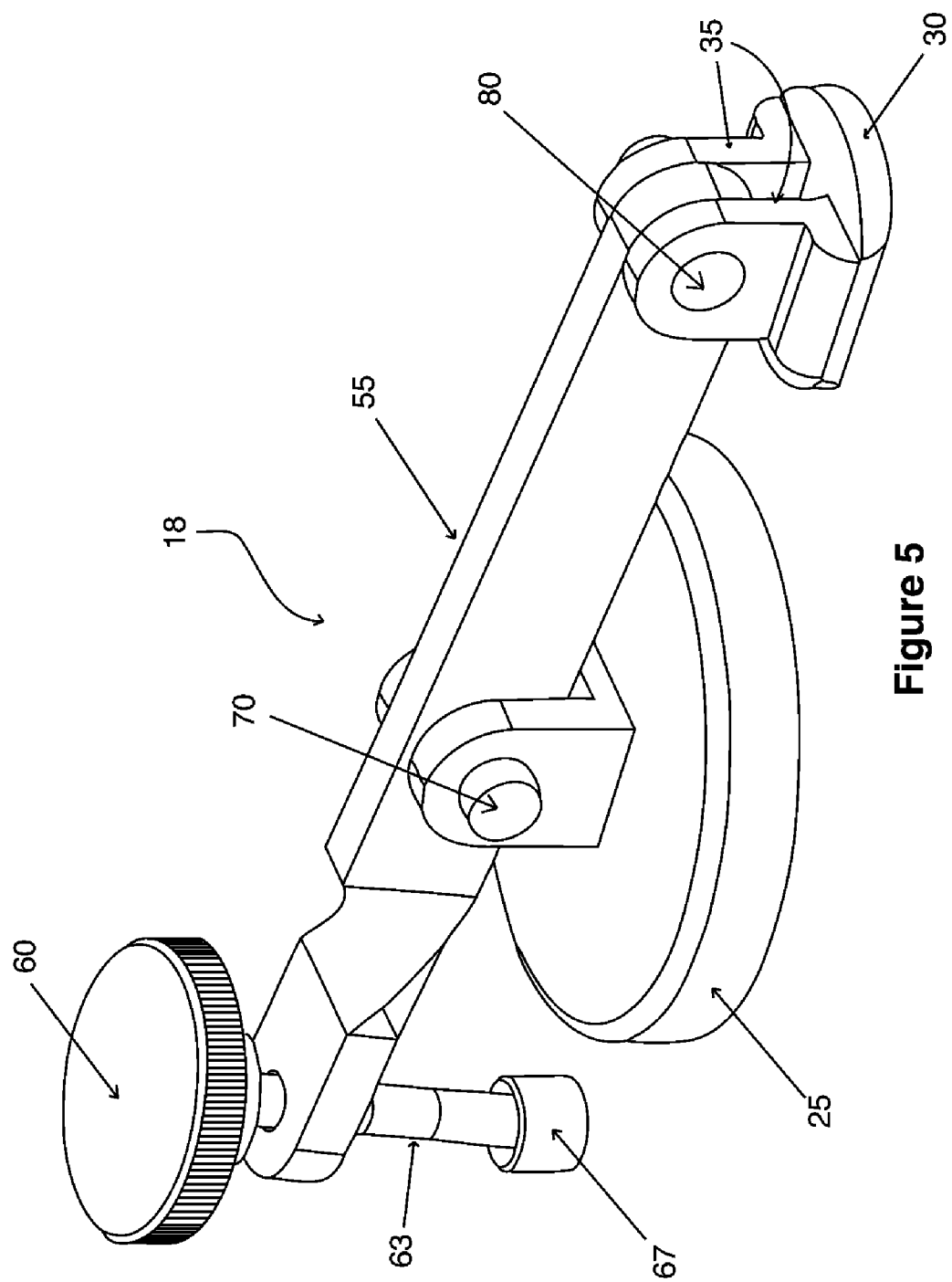
FIG. 5 is a perspective view of an alternative embodiment of a magnetic plug weld tool.

FIG. 5 is a perspective view of an alternative embodiment of a magnetic plug weld tool 18. The alternative embodiment of a magnetic plug weld tool 18 has a circular base with magnet housing 25, a copper alloy plate 30 in one of a variety of shapes and sizes, with its copper wings bent up 35. The copper alloy plate 30 with copper wings bent up 35 is rotatably connected to the proximal end of a longer pivot arm 55 by a pin 80. The circular base with magnet housing 25 is rotatably connected to the mid-section of the longer pivot arm 55 by a pin 70. The distal end of the longer pivot arm 55 has a hole through which is inserted a longer thumb screw 63 topped with a knob 60 and having on the opposite end of the thumb screw 63 from the knob 60 a non maring pad 67.

What is claimed is:

1. A magnetic plug weld tool, comprising:
   a pivot arm with two ends,
   a copper alloy plate that is pivotally connected to one end of said pivot arm,
   a magnetic base that is connected to said pivot arm, and
   a thumb screw inserted through said pivot arm configured to adjust distance of said copper alloy plate from a surface engaged by said magnetic base, wherein said pivot arm pivots via a first pin coupled through a first hole and a second hole of said magnetic base.

2. The magnetic plug weld tool of claim 1, wherein ends of said copper alloy plate are bent up towards said pivot arm.

3. The magnetic plug weld tool of claim 1, wherein a bottom surface of said copper alloy plate is serrated.

4. The magnetic plug weld tool of claim 3, wherein said thumb screw is configured to adjust a position of said copper alloy plate in relation to said magnetic base to flushly contact the bottom surface to an inner surface of a metal sheet.

5. The magnetic plug weld tool of claim 1, wherein said thumb screw is configured to adjust a position of said copper alloy plate to accommodate surfaces with multiple angles.

6. The magnetic plug weld tool of claim 1, wherein said pivot arm pivots via a first pin and said copper alloy plate pivots via a second pin.

7. A magnetic plug weld tool, comprising:
   a base with a magnet housing, said housing containing a magnet,
   a pivot arm with a proximal end and a distal end,
   a copper alloy plate that is rotatably connected to said proximal end of said pivot arm,
   said base with magnet housing is rotatably connected to the mid-section of said pivot arm, and
   the distal end of said pivot arm has a hole through which is inserted a thumb screw topped with a knob configured to adjust distance of said copper alloy plate from a surface engaged by said base, wherein said pivot arm pivots via a first pin coupled through a first hole and a second hole of said base.

8. The magnetic plug weld tool of claim 7, wherein ends of said copper alloy plate are bent up towards said pivot arm.

9. The magnetic plug weld tool of claim 7, wherein a bottom surface of said copper alloy plate is serrated.

10. The magnetic plug weld tool of claim 7, wherein said thumb screw is configured to adjust a position of said copper alloy plate in relation to said magnetic base to flushly contact a bottom surface of said copper alloy plate to an inner surface of a metal sheet.

11. The magnetic plug weld tool of claim 7, wherein said thumb screw is configured to adjust a position of said copper alloy plate to accommodate surfaces with multiple radii of curvature.

12. The magnetic plug weld tool of claim 7, wherein said pivot arm pivots via a first pin and said copper alloy plate pivots via a second pin.

13. The magnetic plug weld tool of claim 7, wherein said copper alloy plate pivots via a second pin coupled through a first hole and a second hole of ends of said copper alloy plate.

14. A magnetic plug weld tool, comprising:
   a base with a magnet housing, said housing containing a magnet,
   a pivot arm connected to said magnet housing, said pivot arm having a proximal end and a distal end,
   a copper alloy plate that is connected to said proximal end of said pivot arm,
   said distal end of said pivot arm has a hole through which is inserted a thumb screw having a non marring pad at one end and a knob at the other end, said thumb screw configured to adjust distance of said copper alloy plate from a surface engaged by said base,
   wherein said pivot arm pivots via a first pin coupled through a first hole and a second hole of the magnetic housing.

15. The magnetic plug weld tool of claim 14, wherein said base is rectangular.

16. The magnetic plug weld tool of claim 14, wherein said thumb screw is configured to adjust a position of said copper alloy plate in relation to said base to flushly contact a bottom surface of said copper alloy plate to an inner surface of a metal sheet.

17. The magnetic plug weld tool of claim 14, wherein said thumb screw is configured to adjust a position of said copper alloy plate to accommodate surfaces with rough patches.

18. The magnetic plug weld tool of claim 14, wherein said pivot arm pivots via a first pin and said copper alloy plate pivots via a second pin.

19. The magnetic plug weld tool of claim 14, wherein a bottom surface of said copper alloy plate is one of serrated, smooth and ridged.

* * * * *